United States Patent
Ishii et al.

(10) Patent No.: US 11,989,132 B2
(45) Date of Patent: May 21, 2024

(54) EARLY CACHE QUERYING

(71) Applicant: Arm Limited, Cambridge (GB)

(72) Inventors: Yasuo Ishii, Austin, TX (US); Jungsoo Kim, Sawston (GB); James David Dundas, Austin, TX (US); Abhishek Raja, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/864,625

(22) Filed: Jul. 14, 2022

(65) Prior Publication Data
US 2024/0020237 A1 Jan. 18, 2024

(51) Int. Cl.
*G06F 12/0897* (2016.01)

(52) U.S. Cl.
CPC ...... *G06F 12/0897* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 6,021,467 A | * | 2/2000 | Konigsburg | G06F 12/0888 711/E12.051 |
| 2006/0168401 A1 | * | 7/2006 | Chatterjee | G06F 12/0862 708/200 |
| 2006/0282621 A1 | * | 12/2006 | Moyer | G06F 9/3802 711/E12.018 |
| 2018/0276125 A1 | * | 9/2018 | Ezoe | G06F 12/0897 |

* cited by examiner

*Primary Examiner* — Stephanie Wu
(74) *Attorney, Agent, or Firm* — NIXON & VANDERHYE P.C.

(57) ABSTRACT

There is provided a data processing apparatus in which receive circuitry receives a result signal from a lower level cache and a higher level cache in respect of a first instruction block. The lower level cache and the higher level cache are arranged hierarchically and transmit circuitry transmits, to the higher level cache, a query for the result signal. In response to the result signal originating from the higher level cache containing requested data, the transmit circuitry transmits a further query to the higher level cache for a subsequent instruction block at an earlier time than the further query is transmitted to the higher level cache when the result signal containing the requested data originates from the lower level cache.

15 Claims, 6 Drawing Sheets

EARLY CACHE QUERYING

TECHNICAL FIELD

The present disclosure relates to data processing and particularly to cache activation.

DESCRIPTION

It is desirable to maintain throughput in the pipeline of a data processing apparatus. Where multiple levels of cache are queried, the throughput of the pipeline could be slowed down.

SUMMARY

Viewed from a first example configuration, there is provided a data processing apparatus comprising: receive circuitry configured to receive a result signal from a lower level cache and a higher level cache in respect of a first instruction block, wherein the lower level cache and the higher level cache are arranged hierarchically; and transmit circuitry configured to transmit, to the higher level cache, a query for the result signal, wherein in response to the result signal originating from the higher level cache comprising requested data, the transmit circuitry is configured to transmit a further query to the higher level cache for a subsequent instruction block at an earlier time than the further query is transmitted to the higher level cache when the result signal comprising the requested data originates from the lower level cache.

Viewed from a second example configuration, there is provided a data processing method comprising: receiving a result signal from a lower level cache and a higher level cache in respect of a first instruction block, wherein the lower level cache and the higher level cache are arranged hierarchically; and transmitting, to the higher level cache, a query for the result signal, wherein in response to the result signal originating from the higher level cache comprising requested data, the further query is transmitted to the higher level cache for a subsequent instruction block at an earlier time than the further query is transmitted to the higher level cache when the result signal comprising the requested data originates from the lower level cache.

Viewed from a third example configuration, there is provided a non-transitory computer-readable medium to store computer-readable code for fabrication of a data processing apparatus comprising: receive circuitry configured to receive a result signal from a lower level cache and a higher level cache in respect of a first instruction block, wherein the lower level cache and the higher level cache are arranged hierarchically; and transmit circuitry configured to transmit, to the higher level cache, a query for the result signal, wherein in response to the result signal originating from the higher level cache comprising requested data, the transmit circuitry is configured to transmit a further query to the higher level cache for a subsequent instruction block at an earlier time than the further query is transmitted to the higher level cache when the result signal comprising the requested data originates from the lower level cache.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
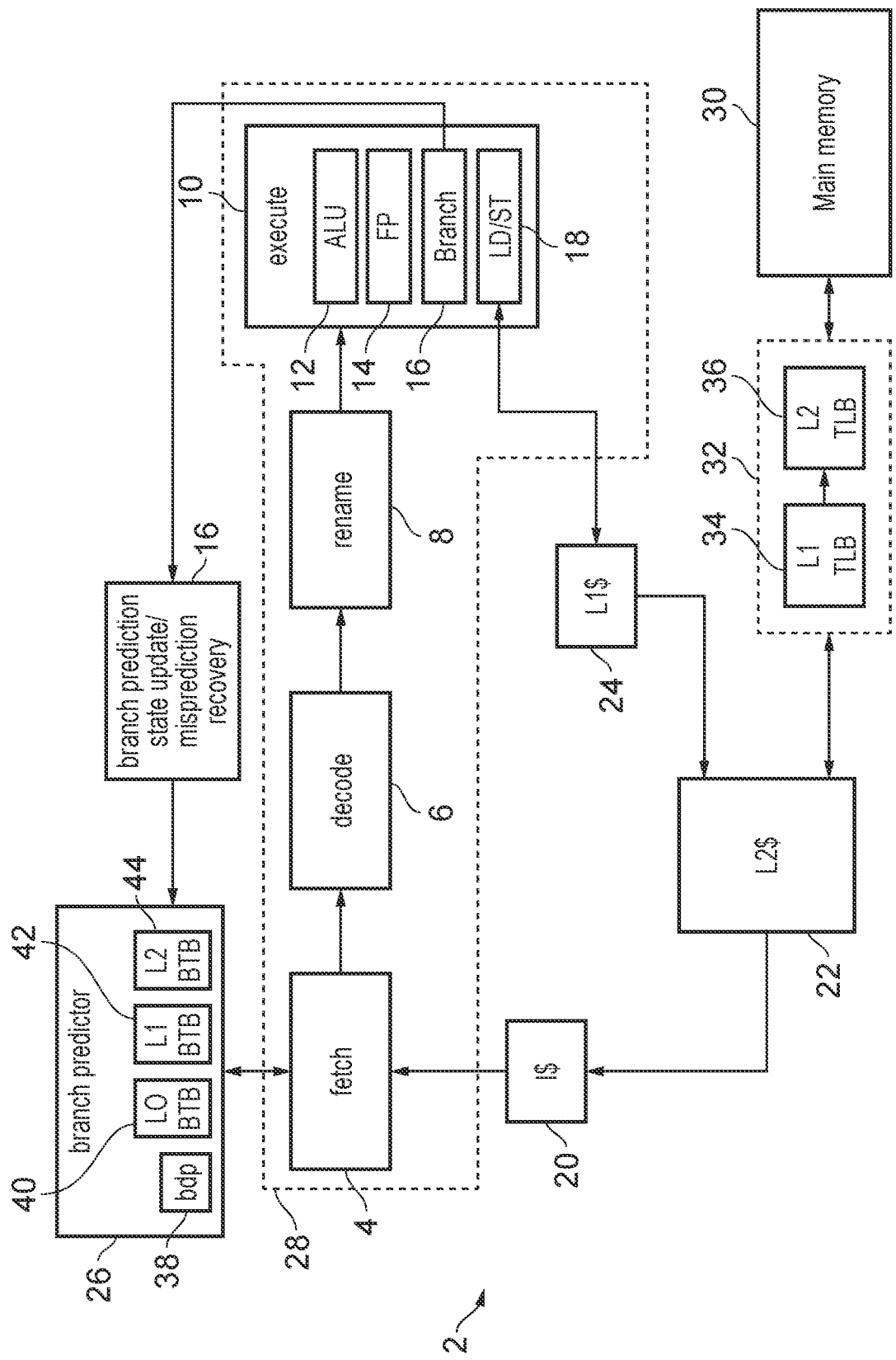
FIG. 1 schematically illustrates an apparatus.

Before discussing the embodiments with reference to the accompanying figures, the following description of embodiments is provided.

In some examples, a data processing apparatus comprising: receive circuitry configured to receive a result signal from a lower level cache and a higher level cache in respect of a first instruction block, wherein the lower level cache and the higher level cache are arranged hierarchically; and transmit circuitry configured to transmit, to the higher level cache, a query for the result signal, wherein in response to the result signal originating from the higher level cache comprising requested data, the transmit circuitry is configured to transmit a further query to the higher level cache for a subsequent instruction block at an earlier time than the further query is transmitted to the higher level cache when the result signal comprising the requested data originates from the lower level cache.

The higher level cache will typically be larger and slower than the lower level cache. The hierarchical organisation means that, under normal circumstances, the lower level cache will be closer to the CPU and will be consulted for stored data prior to higher level caches being consulted. The result signal can arrive from either of the lower level cache or the higher level cache and is the result of a query (e.g. for a prediction), depending on which of the caches was consulted. Typically, a result from one cache is received before consulting another cache. The inventors of the present invention have discovered that the overall throughput of the cache querying can be improved by querying the higher level cache more quickly in dependence on a particular heuristic. In particular, if an immediately previous block of instructions (in control flow order) caused the requested data to be returned from the higher level cache (rather than the lower level cache) then a similar query originating in respect of the subsequent block of instructions (in control flow order) should cause the higher level cache to be consulted more quickly. In many cases, this can result in the requested data being returned more quickly. Furthermore, although querying each cache consumes energy, it is expected that in many cases the overall energy consumption will not significantly rise as a consequence of the higher level cache being queried early in these circumstances. This is because the heuristic suggests that the data will be returned by the higher level cache anyway. The result signal is received in respect of blocks of instructions. This could be because the data is associated with the block itself or could be because the data is associated with a particular instruction within that block of instructions. It will be appreciated that the nature of the heuristic—that is, the nature of the question as to how the prediction for the previous block of instructions was obtained—is dynamic in nature. That is, it is not known at the time of compilation and is instead determined at runtime.

In some examples, the data processing apparatus comprises activation circuitry configured to transmit a power signal to the higher level cache to cause the higher level cache to power up, wherein the transmit circuitry is configured to transmit the query after the power up of the higher level cache has been performed; and in response to the result signal originating from the higher level cache comprising the requested data, the activation circuitry is configured to transmit the power signal for the subsequent instruction block at an earlier time than when the result signal comprising the requested data originates from the lower level cache. The activation circuitry is able to transmit a power signal to the higher level cache to cause it to power up (e.g. to transition from a lower level of power consumption such as being off to a higher level of power consumption). In these situations it is therefore possible to maintain a lower level of energy consumption will also increasing the average throughput of the caches.

In some examples, the power signal is configured to cause the higher level cache to remain powered for a defined period after which, in the absence of a further power signal, the higher level cache is configured to power down. Thus by default the higher level cache is 'off' or in a 'lower power mode' (powered down) and is activated for specific purposes.

In some examples, the defined period corresponds with a time taken for the query to be completed. The higher level cache is therefore activated for a query to be made, after which the higher level cache powers down. This may be useful in the case of particularly large caches that might be power intensive to keep running at all times. In some of these examples, the higher level cache may only be activated where it is known or suspected that the higher level cache will be required. That is, the higher level cache is not queried speculatively, in order to minimise power consumption. Such knowledge that the higher level cache is required (or suspected) could come about from a miss in the immediately previous cache, or from an explicit hint in a previous cache that the higher level cache will be required (e.g. to obtain the full set of requested data).

In some examples, the earlier time is one cycle earlier. That is, if it requires N cycles for the further query to be transmitted when the signal originated from the lower level cache then in the absence of other differences between the queries, it would take N−1 cycles for the further query to be transmitted when the signal originated from the higher level cache.

In some examples, the earlier time is such that operation of the lower level cache and the higher level cache overlaps for the query for the result signal. Consequently, in the situation where, for a first block of instructions, the requested data is returned from the second level cache, for a next block of instructions, the use of the first cache and the second cache is overlapped. The higher level cache is therefore accessed before a result from the lower level cache is returned.

In some examples, the subsequent instruction block is immediately subsequent to the first instruction block in control flow order. The blocks of instructions need not be adjacent in program storage order (e.g. in the program stored in memory).

In some examples, the data processing apparatus comprises: count circuitry configured to determine a proportion of result signals that originate from the higher level cache as opposed to other caches; and the activation circuitry is configured to transmit the power signal for the subsequent instruction block at the earlier time in further dependence on the proportion being above a predefined threshold. The count circuitry can therefore be used to limit the early use of the second cache circuitry to only those situations where the requested data is (over a number of queries) coming from the higher level cache rather than the lower level cache (as reported by the count circuitry). The count circuitry could take the form of a counter that increments when the requested data originates from one of the caches and decrements when the requested data originated from another one of the caches. The resulting counter then gives an indication of whether the requests are in proportion or not. In other examples, the count circuitry could contain two counters—one to count occasions when the result originates from the higher level cache and one to count occasions when the result originates from the lower level cache. These two values can then be used to determine the proportion of all occasions where the result originates from the higher level cache.

In some examples, the predefined threshold is 50%. Therefore, when the majority of results are returned from the higher level cache, and when the previous block of instructions caused a result to be returned from the higher level cache, then the current block of instructions causes the second level cache to be queried more quickly (i.e. earlier).

In some examples, the lower level cache and the higher level cache are both one of: a translation lookaside buffer, a data cache, an instruction cache, and a branch target buffer. Note that in some cases, a cache might be dual purpose. For instance, a second level data cache might act as a second level instruction cache by storing instructions that are evicted from the instruction cache. This can be determined from the ordering in which the caches as queried when data is requested.

In some examples, the lower level cache is a level one or level zero branch target buffer; the higher level cache is a level two branch target buffer; and the requested data is a prediction that the first instruction block contains a branch instruction. A branch target buffer can be used to predict whether a block of instructions contains a branch instruction or not—without examining and/or decoding each individual instruction within that block. In some cases, the branch target buffer might indicate the location and/or number of branch instructions within the block, whether those branches are likely to be taken or not, and what the target of any branch instruction may be. This information can be passed to a fetch stage of a pipeline in order to cause the 'next' block of instructions (at the target of any branch or following the current block of instructions if there is no branch that will be taken) to be fetched. It is often the case that, by default, the fetch stage fetches a current block of instructions and the instruction block immediately following it (e.g. the instructions starting at address A, and the instructions starting at address A+(32*8)). Consequently, if a branch predictor then determines that a branch to address Y is to be taken in the first block of instructions, then a new fetch of the instructions at address Y immediately takes place. This can result in a 'stall', particularly when it is only revealed at a late stage of the process that a branch in block A will take place (i.e. as would be the case if the prediction arises from a second level branch instruction). If this happens repeatedly, starvation of instructions can occur. By causing the further query to happen at an earlier time, it is possible to obtain the prediction (requested data) more quickly, and therefore improve the overall throughput of instruction fetching.

In some examples in response to the result signal originating from the higher level cache not comprising the requested data, the transmit circuitry is configured to transmit the further query to the higher level cache for a subsequent instruction block when the result signal comprising the requested data originates from the lower level cache. Where the requested data is not present (e.g. from the higher level cache), no early querying takes place. In the case of a branch target buffer, this equates to the situation where a miss occurs in the level 2 branch target buffer or where the level 2 branch target buffer reports that no branch is predicted in the earlier instruction block. This represents situations where the higher level cache is not required. Consequently there is no need for early querying to take place. Indeed, by avoiding the early querying, it is possible to reduce wasted activations of a higher level cache when the earlier branch is predicted, resulting in a flush of the pipeline and an injection of a new branch target.

In some examples, the data processing apparatus comprises: fetch circuitry configured to fetch the first instruction block and the subsequent instruction block; and in response to the result signal originating from the lower level cache comprising the requested data, the fetch circuitry is configured to fetch the subsequent block based on the requested data. The fetch circuitry is therefore used to fetch the block of instructions that is indicated by the requested data.

Particular embodiments will now be described with reference to the figures.

FIG. 1 schematically illustrates an apparatus 2. The apparatus 2 has a processing pipeline 28 which includes a number of pipeline stages. In this example, the pipeline stages include a fetch stage 4 for fetching instructions from an instruction cache 20; a decode stage 6 for decoding the fetched program instructions to generate micro-operations to be processed by remaining stages of the pipeline; a register renaming stage 8 for mapping architectural registers specified by program instructions or micro-operations to physical register specifiers identifying physical registers in a register file; and an execute stage 10 for executing data processing operations corresponding to the micro-operations, by processing operands read from the register file to generate result values. It will be appreciated that this is merely one example of possible pipeline architecture, and other systems may have additional stages or a different configuration of stages.

The execute stage 10 includes a number of processing units, for executing different classes of processing operation. For example the execution units may include a scalar arithmetic/logic unit (ALU) 12 for performing arithmetic or logical operations on scalar operands read from the registers; a floating point unit 14 for performing operations on floating-point values; a branch unit 16 for evaluating the outcome of branch operations and adjusting the program counter which represents the current point of execution accordingly; and a load/store unit 18 for performing load/store operations to access data in a memory system 20, 22, 24, 30. The specific types of processing unit 12, 14, 16, 18 shown in the execute stage 10 are just one example, and other implementations may have a different set of processing units or could include multiple instances of the same type of processing unit so that multiple micro-operations of the same type can be handled in parallel.

In this example, the memory system includes a level one data cache 24, the level one instruction cache 20, a shared level two cache 22, and a main memory 30. It will be appreciated that this is just one example of a possible memory hierarchy and other arrangements of caches can be provided. In this example, address translation circuitry 32 is provided to translate virtual memory addresses to physical memory addresses, which are used by the main memory 30.

The address translation circuitry 32 is shown here between the main memory 30 and the level two cache 22 although it will be appreciated that the address translation circuitry 32 could also be located elsewhere. The address translation circuitry is able to manually scan page tables in order to provide a requested translation between a virtual address and a physical address. However, translation lookaside buffers (TLBs) 34, 36 are provided to cache commonly or recently used translations so that they can be accessed more quickly. In particular, as with other caches, the lower level (level one) TLB is smaller and faster than the higher level (level two) TLB and the caches are typically accessed in that order.

It will be appreciated that FIG. 1 is merely a simplified representation of some components of a possible processor pipeline architecture, and the processor may include many other elements not illustrated for conciseness.

As shown in FIG. 1, the apparatus 2 has at least one prediction mechanism for predicting instruction behaviour for instructions at particular instruction addresses in the form of branch predictor 26. The branch predictor 26 may be provided for predicting outcomes of branch instructions, which are instructions which can cause a non-sequential change of program flow. Branches may be performed conditionally, so that they may not always be taken. The branch predictor 26 is looked up based on addresses of instructions provided by the fetch stage 4, and provides a prediction of whether those instruction addresses are predicted to correspond to branch instructions. For any predicted branch instructions, the branch predictor 26 provides a prediction of their branch properties such as a branch type, branch target address and branch direction (branch direction is also known as predicted branch outcome, and indicates whether the branch is predicted to be taken or not taken). The branch predictor 26 includes branch target buffers (BTBs) 40, 42, 44 for predicting properties of the branches other than branch direction, and a branch direction predictor (BDP) 38 for predicting the not taken/taken outcome of a branch (branch direction). It will be appreciated that the branch predictor 26 could also include other prediction structures, such as a call-return stack for predicting return addresses for function calls, a loop direction predictor for predicting when a loop controlling instruction will terminate a loop, or other specialised types of branch prediction structures for predicting behaviour of branches in specific scenarios. The BTBs 40, 42, 44 act as caches correlating particular instruction addresses (or blocks of instructions) with sets of one or more branch properties such as branch type or the branch target address (the address predicted to be executed next after the branch if the branch is taken), and may also provide a prediction of whether a given instruction address is expected to correspond to a branch at all. In this example, the BTBs 40, 42, 44 are arranged hierarchically with a level 0 BTB 40 being smaller and faster than the level 1 BTB 42, which itself is smaller and faster than a level 2 BTB 44. The BTBs are accessed in that order. In some situations, the use of one BTB is dependent on a miss occurring in its predecessors. In other situations, the use of one BTB is performed speculatively—i.e. before it is known for certain whether a miss occurred with the previous BTBs.

Due to the large size of the level 2 BTB 44, in this example, the BTB is defaulted to being in an off (powered down) state so as to reduce energy consumption. The level 2 BTB 44 is activated in one of two situations: (1) a miss occurs in the level 1 BTB 42; or (2) a hit occurs in either of the level 0 BTB 40 or the level 1 BTB 42 and the entry that is hit contains a hint that further relevant information may be stored in the level 2 BTB 44. In these situations, the level 2

BTB 44 is activated (powered up) and queried. Once the query is complete, it is then powered down (unless a further query is incoming).

The branch direction predictor 38 may be based on a variety of (or even multiple) different prediction techniques, e.g. a TAGE predictor and/or a perceptron predictor, which includes prediction tables which track prediction state used to determine whether, if a given instruction address is expected to correspond to a block of instructions including a branch, whether that branch is predicted to be taken or not taken. The BDP 38 may base its prediction on local history records.

The apparatus 2 may have branch prediction state updating circuitry and misprediction recovery circuitry 16, which updates state information within the branch predictor 26 based on observed instruction behaviour seen at the execute stage 10 for branch instructions executed by the branch unit 16. When the branch instruction is executed and the observed behaviour for the branch matches the prediction made by the branch predictor 26 (both in terms of whether the branch is taken or not and in terms of other properties such as branch target address) then the branch prediction state updating circuitry 46 may update prediction state within the BDP 38 or the BTBs 40, 42, 44 to reinforce the prediction that was made so as to make it more confident in that prediction when that address is seen again later. Alternatively, if there was no previous prediction state information available for a given branch then when that branch is executed at the execute stage 10, its actual outcome is used to update the prediction state information. On the other hand, if a misprediction is identified when the actual branch outcome differs from the predicted branch outcome in some respect, then the misprediction recovery portion of the state updating/misprediction recovery circuitry 16 may control updating of state within the branch predictor 26 to correct the prediction state so that it is more likely that the prediction will be correct in future. In some cases, a confidence counter-based mechanism may be used so that one incorrect prediction does not necessarily overwrite the prediction state which has previously been used to generate a series of correct predictions, but multiple mispredictions for a given instruction address will eventually cause the prediction state to be updated so that the outcome actually being seen at the execute stage 10 is predicted in future. As well as updating state information within the branch predictor 26, on a misprediction, the misprediction recovery circuitry may also cause instructions to be flushed from the pipeline 28 which are associated with instruction addresses beyond the address for which the misprediction was identified, and cause the fetch stage 4 to start refetching instructions from the point of the misprediction.

Figure 2:
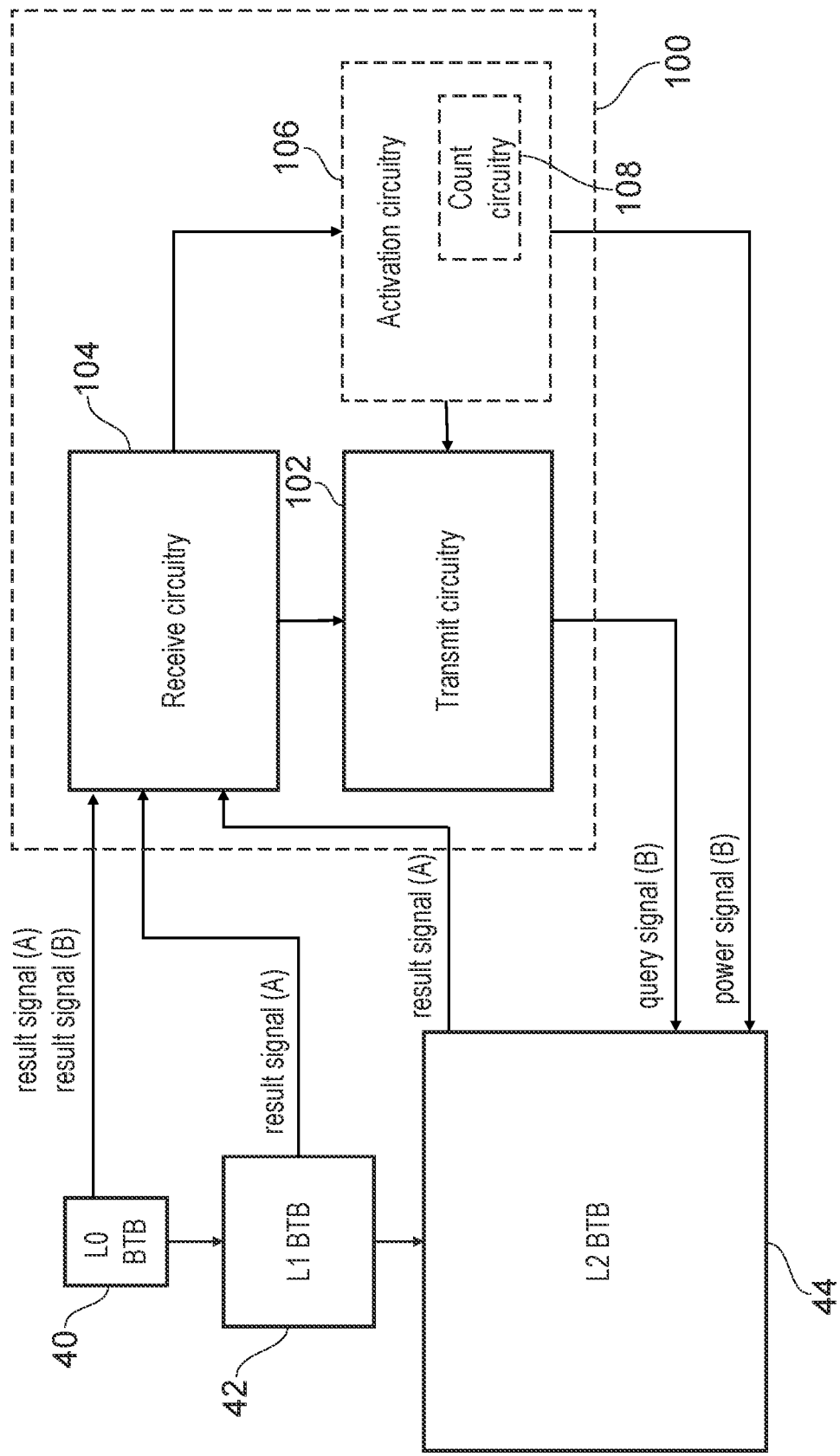
FIG. 2 illustrates an example of the claimed data processing apparatus.

FIG. 2 illustrates an example of the claimed data processing apparatus 100. The data processing apparatus receives result signals from each of the level 0 BTB 40, the level 1 BTB 42, and the level 2 BTB 44. These result signals contain a hit/miss indication together with any stored data (in the case of a hit for a given block of instructions). The result signals are received by receive circuitry 104.

In normal operation, when the result signal indicates a miss in the level 1 BTB 42, or when a hit occurs in either of the level 0 BTB 40 or the level 1 BTB 42 but the hit also contains a hint that further data is stored in the level 2 BTB 44, the receive circuitry 104 causes the activation circuitry 106 to send a power signal to the level 2 BTB 44 to cause the level 2 BTB 44 to power up (activate). A query is then sent for the instruction block to the level 2 BTB 44, which sends a result signal to the receive circuitry 104. The level 2 BTB 44 then (in the absence of further queries) powers back down. This powering up and down means that the level 2 BTB 44 can be kept offline for periods of time and thereby reduce energy consumption as compared to a situation where the level 2 BTB 44 is permanently powered up.

In the present example, the level 2 BTB 44 is queried sooner (and activated if the level 2 BTB 44 powers down after each query) when particular criteria are met—that is, based on heuristical information. This heuristical information acts as an alternative for the above conditions (miss in the level 1 BTB 42 or hint in the level 0 BTB 40 or level 1 BTB 42) so that it is not necessary to wait to receive the miss/hint information before querying (and powering up) the level 2 BTB 44. The level 2 BTB 44 can therefore be queried more quickly. In particular, consider a pair of instruction blocks A and B. These are not necessary consecutive in program order, but are consecutive in program flow order. That is, the blocks may not be together in the program as stored in memory, but are encountered immediately sequentially to each other when executing the program. If the level 2 BTB 44 is the device to predict a branch in instruction block A then it is assumed that the level 2 BTB 44 will predict a branch for instruction block B as well. Consequently, the level 2 BTB 44 is queried (and powered up) more quickly for instruction block B—e.g. before it is known for certain whether the prediction data for instruction block B will be present elsewhere. It is the observation of the inventors that when the level 2 BTB 44 must be queried in this way for one instruction block, it is likely necessary to query the level 2 BTB 44 for subsequent instruction blocks as well. By querying (and powering up) the level 2 BTB 44 more quickly, the overall throughput of this system can be improved. When the above heuristic is not met, a miss in the level 1 BTB 42 or a hint in either of the level 0 BTB 40 or the level 1 BTB 42 still cause the level 2 BTB 44 to be queried. However, in this situation, the querying does not happen earlier than would occur under normal operation.

Note that in these examples, the level 2 BTB 44 is powered up before being queried. However, the improvement in throughput is still achieved even if the level 2 BTB 44 is permanently powered up.

Count circuitry 108 can optionally be used as a further mechanism to determine whether the early querying of the level 2 BTB 44 should take place. It determines whether the majority of branches are being predicted by the level 2 BTB 44 or not and only where the majority of branches (e.g. over 50%) are predicted by the level 2 BTB 44 (and where the previous block of instructions were predicted to branch by the level 2 BTB 44), is the level 2 BTB 44 activated early. This can be achieved by a simple counter that increments each time the level 2 BTB 44 predicts a branch and decrements in each other situation—a positive score then indicates that early querying is enabled whereas otherwise it is disabled. Alternatively, a pair of counters could be provided to count both branch predictions and non-branch predictions and when the activations outnumber the non-branch predictions, the early querying is enabled.

Figure 3:
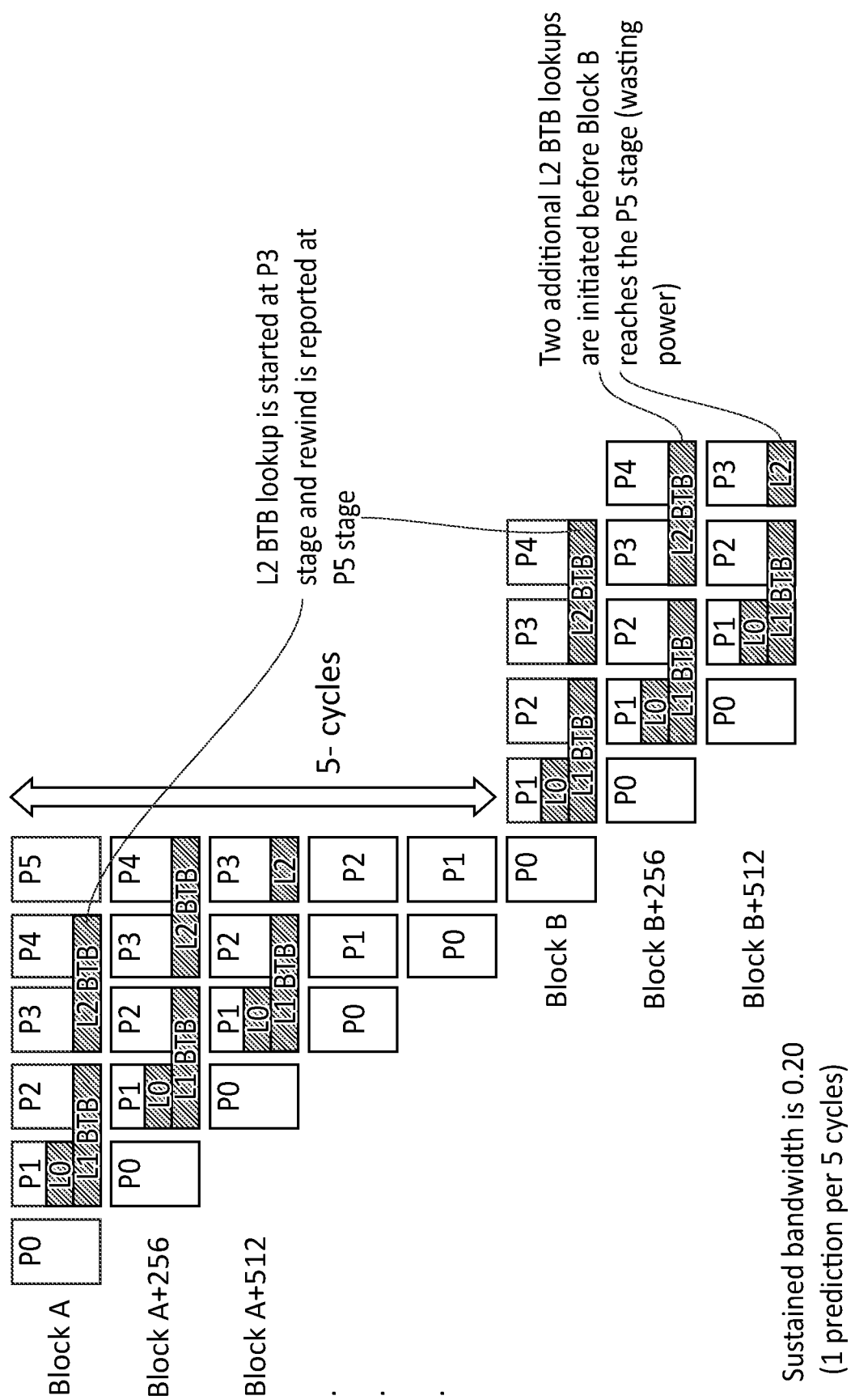
FIG. 3 illustrates the normal behaviour of the BTB lookup for a first block of instructions A and a second block of instructions B that occurs after a branch in block A.

FIG. 3 illustrates the normal behaviour of the BTB lookup for a first block of instructions A and a second block of instructions B that occurs after a branch in block A. The lookup process is pipelined into a number of stages—P0, P1, P2, P3, P4, P5. For a first block A, at a pipeline stage P0, the fetching of block A occurs and initialisation of the lookups takes place. At a stage P1, the level 0 BTB 40 and the level 1 BTB 42 are both queried. The level 0 BTB 40 lookup takes only a single cycle and so the result of the lookup is available by the end of stage P1. Here there is no hit and no hint. The lookup of the level 1 BTB 42 requires two cycles and so the result is available by the end of stage P2. Again, in this example there is no hit and no hint. Consequently, power up and activation of the level 2 BTB 44 occurs at stage P3. This lookup again takes two cycles, which therefore becomes available towards the end of stage P4. Finally, at stage P5, it is determined that a hit occurred in the level 2 BTB 44 and that a branch was detected and in this case, predicted taken. Note that if a hit had occurred in the level 0 BTB 40 or the level 1 BTB 42 then the level 2 BTB 44 would not need to be activated. Furthermore, if a hint had been received in the level 0 BTB 40 then the level 2 BTB 44 would have been activated and queried one cycle faster. This situation is rare owing to the very small size of the level 0 BTB 40.

In the absence of any hit, the system assumes that the contiguous instruction blocks following block A should be fetched and predictions sought. Here we assume that each block of instructions is 256 bytes in length. A similar series of stages is therefore performed for instruction block A+256 and then for instruction block A+512 and so on. When the branch is detected in block A, these entries are flushed. That is, because it is predicted that the control flow proceeds to block B rather than to block A+256, the predictions made are irrelevant. Block B is then 'injected' into the pipeline. In this example, it requires 5 cycles to determine the prediction in respect of block A.

A similar process is then carried out for instruction block B (and contiguous blocks B+256 and B+512). The process again takes a total of 5 cycles to determine the prediction in respect of block B.

As will be appreciated from FIG. 3, this results in an average sustained bandwidth of 0.2 blocks per cycle. If a large number of consecutive blocks require predictions from the level 2 BTB 44 then this can result in starvation of the pipeline. Furthermore, while waiting for a prediction for each block, it is assumed that the blocks of instructions immediately following (in program order) the current block will be executed next. This results in those blocks being fetched and (in order to maintain bandwidth in the pipeline) predictions sought. Thus, power is wasted by looking up predictions of blocks of instructions that may not be executed.

Figure 4:
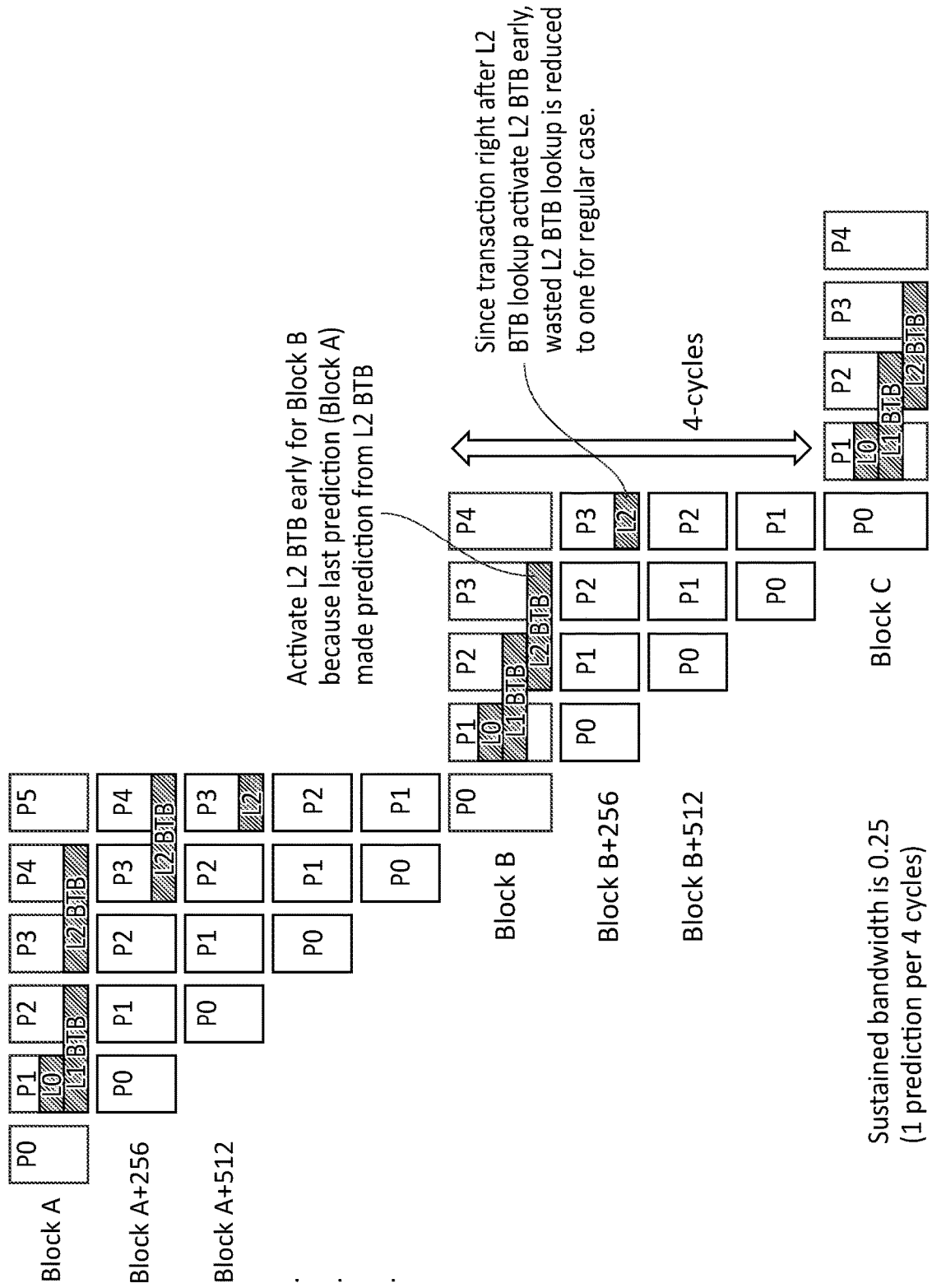
FIG. 4 shows alternative behaviour in accordance with the present examples.

FIG. 4 shows alternative behaviour in accordance with the present examples. Here, the process for the prediction of instruction block A proceeds in the same way as for FIG. 3—noting that the prediction of a branch is derived in the end from the level 2 BTB 44.

When assessing instruction block B, predictions are sought from the level 0 BTB and the level 1 BTB 42 as before. This time, however, because the prediction of a branch was derived from the level 2 BTB 44, the level 2 BTB 44 is activated and queried one cycle earlier than normal. In particular, the level 2 BTB 44 is queried at stage P2 (despite there being no hint from the level 0 BTB 40 and no miss yet being received from the level 1 BTB 42). Thus, the querying of the level 1 BTB 42 and the level 2 BTB 44 overlap with each other by one cycle. That is, the heuristic "the previous instruction block received a prediction of a branch from the level 2 BTB 44" is used as an alternative criterion to activate and query the level 2 BTB 44. As a consequence of this, the prediction result is obtained in four cycles rather than five. For a series of instructions where predictions derive from the level 2 BTB 44, the average sustained bandwidth is therefore 0.25 instructions per cycle.

It will be appreciated that the contiguous instruction blocks (B+256 and B+512) that are automatically fetched and brought into the pipeline do not take advantage of this heuristic. That is because those blocks are pulled in on the assumption that no branch takes place in block B and therefore the previous blocks (B and B+256 respectively) are predicted to not contain branches. The activation and querying of the level 2 BTB 44 therefore follows the usual protocols and occurs in stage P3 (stage P2 in the event of a hint in the level 0 BTB 40). As a consequence, only one 'wasted' activation of the level 2 BTB 44 occurs for the block B+256.

Figure 5:
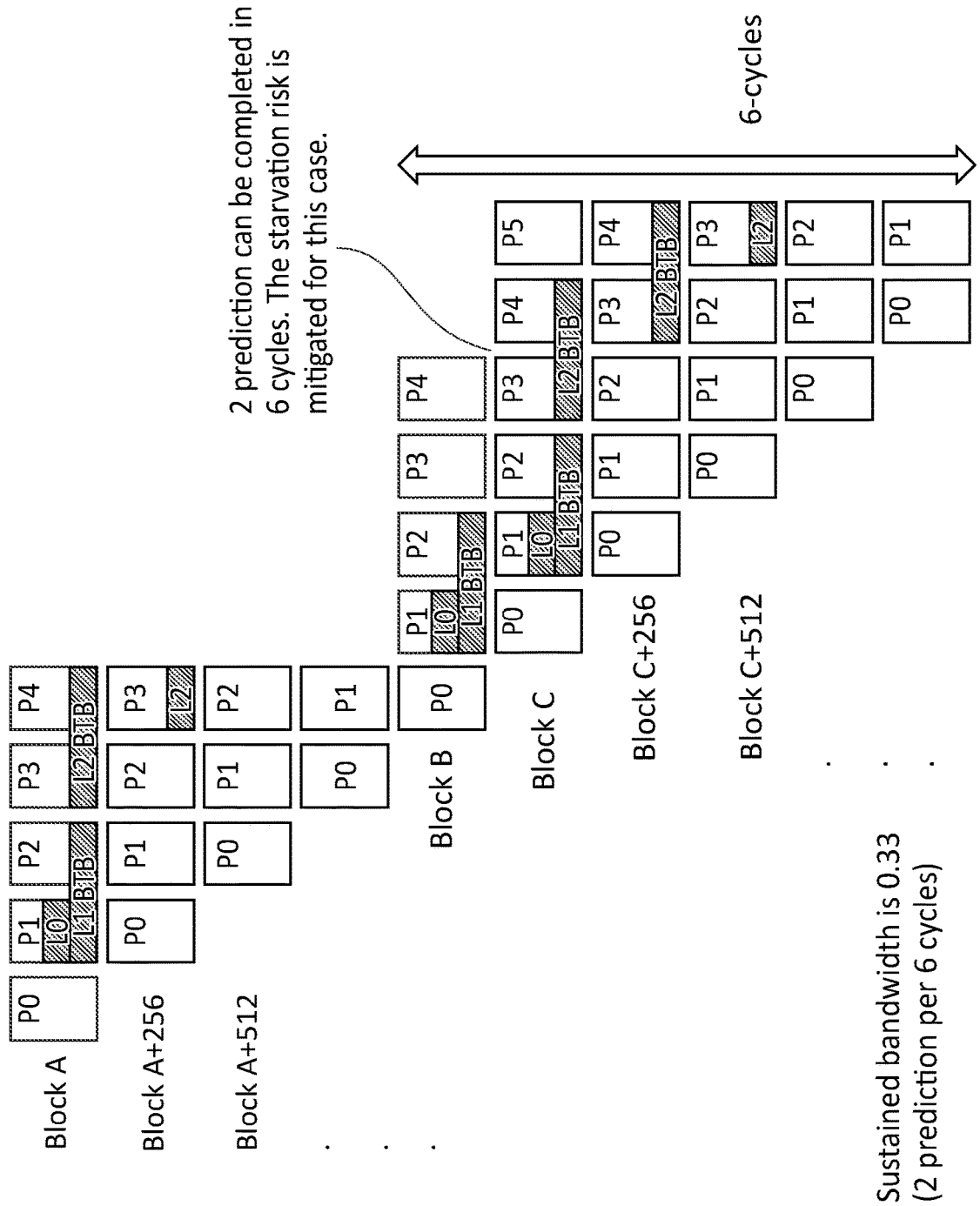
FIG. 5 considers the situation in which instruction block B does not use the level 2 BTB.

FIG. 5 considers the situation in which instruction block B does not use the level 2 BTB 44. Here, again, the process for block A follows the same process as shown in FIG. 3 and FIG. 4. At block B, the level 0 BTB 40 and the level 1 BTB 42 are both activated and queried at stage P1. However, here there is a hit with no hint. Consequently, before the level 2 BTB 44 can be queried (early), it is determined that no querying needs to take place with the level 2 BTB 44. The prediction that is obtained indicates that a branch to block C takes place, and so the pipeline is flushed and blocks C, C+256, and C+512 are immediately injected into the pipeline. This time, because the level 2 BTB 44 did not predict a branch in the earlier block (B), early activation and querying of the level 2 BTB 44 is disabled. The process then follows the same process as shown for instruction block A, with the level 2 BTB 44 being activated at stage P3 (if a hint had been received from the level 0 BTB 40 then this could occur at stage P2).

Overall, this results in two resolutions occurring within 6 cycles, thereby providing an overall throughput of 0.33 instructions per cycle—still an improvement over the technique illustrated with respect to FIG. 3.

Figure 6:
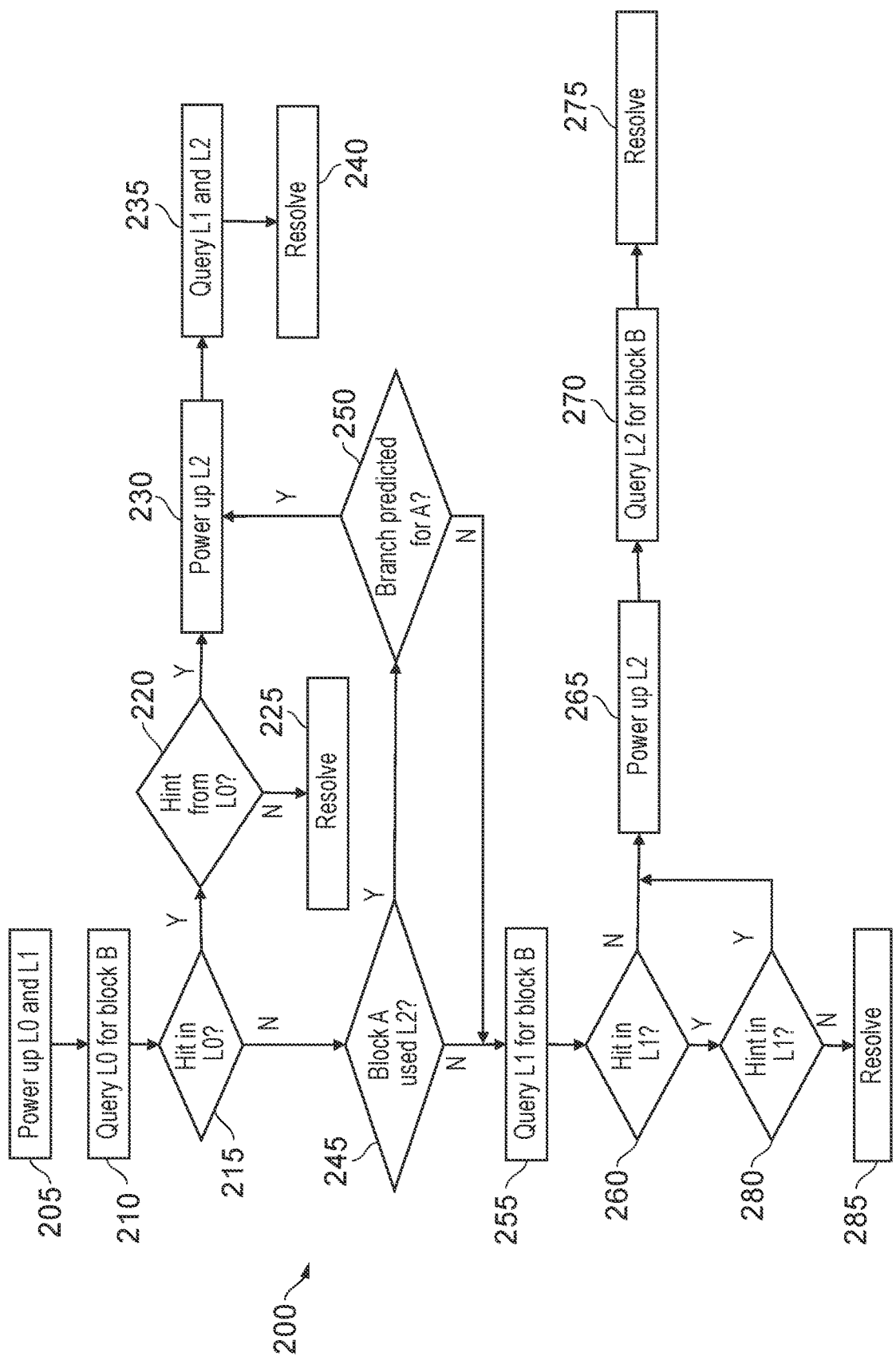
FIG. 6 illustrates the behaviour of the data processing apparatus in the form of a flowchart.

FIG. 6 illustrates the behaviour of the data processing apparatus in the form of a flowchart 200. The process begins at a step 205 where the L0 cache 40 and the L1 cache 42 are both powered up. Then, at step 210, a query is initiated for block B at the L0 cache (e.g. BTB) 40. The result (which may return in the same processor cycle) is reviewed at step 215. At step 215, it is determined whether there was a hit for block B in the level 0 cache 40. Then it is determined at step 220 whether the result indicated that there was a hint to activate other caches 42, 44. If not, then there is nothing further to query and so resolution occurs at step 225. Otherwise at step 230, the level 2 cache 44 is powered up and the level 1 cache 42 and the level 2 cache are queried at step 235. This might take several processor cycles to complete. When the results are returned, resolution occurs at step 240 based on any received predictions/data.

If there is no hit in the level 0 cache 40 at step 215, then at step 245 it is determined whether the previous block (block A) used the level 2 cache 44 or not. If so, then at step 250, it is determined whether a branch was predicted in that access. If so, the process proceeds to step 230 as previously described and otherwise it proceeds to step 255. The process also proceeds to step 255 if block A did not use the level 2 cache 44.

At step 255, the level 1 cache 42 is queried and it is determined at step 260 whether a hit occurs in the level 1 cache 42. If so, then the process proceeds to step 280 where it is determined whether the hit indicates a hint to access the level 2 cache 44 (i.e. that there might be further results in the level 2 cache 44). If there is no hint, then at step 285 resolution occurs based on any received data.

If there is no hint in the level 1 cache 42 or if there is a hit together with a hint at step 280 then the process proceeds to step 265. Here, the level 2 cache 44 is powered up and at step 270, the level 2 cache 44 is queried for entries pertaining to block B. Resolution then occurs based on any received data at step 275.

From the above, it is clear that the powering up and querying of the level 2 cache/BTB 44 occurs (steps 230, 235) earlier if the previous block (block A) used the level 2 cache to produce a branch prediction (steps 245, 250) than otherwise (steps 265, 270). This technique therefore makes use of the heuristic that when the previous block uses the level 2 cache 44 to obtain a prediction, then it is a reasonable assumption that the following block also uses the same cache 44 to obtain a prediction.

Many of the above examples consider the use of a hierarchy of branch target buffers (BTBs). However, the present techniques are equally applicable to other hierarchical caches where a result from a lower level of the hierarchy indicates whether a higher level of the hierarchy should be accessed.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The application could be configured in accordance with the following clauses:

1. A data processing apparatus comprising:
   receive circuitry configured to receive a result signal from a lower level cache and a higher level cache in respect of a first instruction block, wherein the lower level cache and the higher level cache are arranged hierarchically; and
   transmit circuitry configured to transmit, to the higher level cache, a query for the result signal, wherein
   in response to the result signal originating from the higher level cache comprising requested data, the transmit circuitry is configured to transmit a further query to the higher level cache for a subsequent instruction block at an earlier time than the further query is transmitted to the higher level cache when the result signal comprising the requested data originates from the lower level cache.

2. The data processing apparatus according to clause 1, comprising:
   activation circuitry configured to transmit a power signal to the higher level cache to cause the higher level cache to power up, wherein
   the transmit circuitry is configured to transmit the query after the power up of the higher level cache has been performed; and in response to the result signal originating from the higher level cache comprising the requested data, the activation circuitry is configured to transmit the power signal for the subsequent instruction block at an earlier time than when the result signal comprising the requested data originates from the lower level cache.

3. The data processing apparatus according to any preceding clause, wherein
the power signal is configured to cause the higher level cache to remain powered for a defined period after which, in the absence of a further power signal, the higher level cache is configured to power down.

4. The data processing apparatus according to clause 3, wherein
the defined period corresponds with a time taken for the query to be completed.

5. The data processing apparatus according to any preceding clause, wherein
the earlier time is one cycle earlier.

6. The data processing apparatus according to any preceding clause, wherein
the earlier time is such that operation of the lower level cache and the higher level cache overlaps for the query for the result signal.

7. The data processing apparatus according to any preceding clause, wherein
the subsequent instruction block is immediately subsequent to the first instruction block in control flow order.

8. The data processing apparatus according to any preceding clause, comprising:
count circuitry configured to determine a proportion of result signals that originate from the higher level cache as opposed to other caches; and
the activation circuitry is configured to transmit the power signal for the subsequent instruction block at the earlier time in further dependence on the proportion being above a predefined threshold.

9. The data processing apparatus according to clause 8, wherein the predefined threshold is 50%.

10. The data processing apparatus according to any preceding clause, wherein
the lower level cache and the higher level cache are both one of: a translation lookaside buffer, a data cache, an instruction cache, and a branch target buffer.

11. The data processing apparatus according to any preceding clause, wherein
the lower level cache is a level one or level zero branch target buffer;
the higher level cache is a level two branch target buffer; and
the requested data is a prediction that the first instruction block contains a branch instruction.

12. The data processing apparatus according to any preceding clause, wherein
in response to the result signal originating from the higher level cache not comprising the requested data, the transmit circuitry is configured to transmit the further query to the higher level cache for a subsequent instruction block when the result signal comprising the requested data originates from the lower level cache.

13. The data processing apparatus according to any one of clauses 11-12:
fetch circuitry configured to fetch the first instruction block and the subsequent instruction block; and
in response to the result signal originating from the lower level cache comprising the requested data, the fetch circuitry is configured to fetch the subsequent block based on the requested data.

14. A data processing method comprising:
receiving a result signal from a lower level cache and a higher level cache in respect of a first instruction block, wherein the lower level cache and the higher level cache are arranged hierarchically; and
transmitting, to the higher level cache, a query for the result signal, wherein
in response to the result signal originating from the higher level cache comprising requested data, the further query is transmitted to the higher level cache for a subsequent instruction block at an earlier time than the further query is transmitted to the higher level cache when the result signal comprising the requested data originates from the lower level cache.

15. A non-transitory computer-readable medium to store computer-readable code for fabrication of a data processing apparatus comprising:
receive circuitry configured to receive a result signal from a lower level cache and a higher level cache in respect of a first instruction block, wherein the lower level cache and the higher level cache are arranged hierarchically; and
transmit circuitry configured to transmit, to the higher level cache, a query for the result signal, wherein
in response to the result signal originating from the higher level cache comprising requested data, the transmit circuitry is configured to transmit a further query to the higher level cache for a subsequent instruction block at an earlier time than the further query is transmitted to the higher level cache when the result signal comprising the requested data originates from the lower level cache.

We claim:
1. A data processing apparatus comprising:
receive circuitry configured to receive a result signal from one of a lower level cache and a higher level cache in respect of a first instruction block, wherein the lower level cache and the higher level cache are arranged hierarchically; and
transmit circuitry configured to transmit a query to the higher level cache for a subsequent instruction block, different from the first instruction block within a time limit; and
the time limit is dependent on an origin of the result signal so that the time limit is smaller when the result signal comprising the requested data originates from the higher level cache than when the result signal comprising the requested data originates from the lower level cache.

2. The data processing apparatus according to claim 1, comprising:
activation circuitry configured to transmit a power signal to the higher level cache within a further time limit to cause the higher level cache to power up, wherein
the transmit circuitry is configured to transmit the query after the power up of the higher level cache has been performed; and
the further time limit is smaller when the result signal comprising the requested data originates from the higher level cache than when the result signal comprising the requested data originates from the lower level cache.

3. The data processing apparatus according to claim 2, wherein
the power signal is configured to cause the higher level cache to remain powered for a defined period after which, in the absence of a further power signal, the higher level cache is configured to power down.

4. The data processing apparatus according to claim 3, wherein
the defined period corresponds with a time taken for the query to be completed.

5. The data processing apparatus according to claim 1, wherein
the time limit is one cycle smaller when the result signal comprising the requested data originates from the higher level cache than the further query is transmitted to the higher level cache when the result signal comprising the requested data originates from the lower level cache.

6. The data processing apparatus according to claim 1, wherein
the time limit is smaller when the result signal comprising the requested data originates from the higher level cache than the further query is transmitted to the higher level cache when the result signal comprising the requested data originates from the lower level cache
such that operation of the lower level cache and the higher level cache overlaps for the query for the result signal.

7. The data processing apparatus according to claim 1, wherein
the subsequent instruction block is immediately subsequent to the first instruction block in control flow order.

8. The data processing apparatus according to claim 1, comprising:
count circuitry configured to determine a proportion of result signals that originate from the higher level cache as opposed to other caches; and
the activation circuitry is configured to transmit the power signal for the subsequent instruction block at the earlier time in further dependence on the proportion being above a predefined threshold.

9. The data processing apparatus according to claim 8, wherein
the predefined threshold is 50%.

10. The data processing apparatus according to claim 1, wherein
the lower level cache and the higher level cache are both one of: a translation lookaside buffer, a data cache, an instruction cache, and a branch target buffer.

11. The data processing apparatus according to claim 1, wherein
the lower level cache is a level one or level zero branch target buffer;
the higher level cache is a level two branch target buffer; and
the requested data is a prediction that the first instruction block contains a branch instruction.

12. The data processing apparatus according to claim 1, wherein
in response to the result signal originating from the higher level cache not comprising the requested data, the transmit circuitry is configured to transmit the further query to the higher level cache for a subsequent instruction block when the result signal comprising the requested data originates from the lower level cache.

13. The data processing apparatus according to claim 11:
fetch circuitry configured to fetch the first instruction block and the subsequent instruction block; and
in response to the result signal originating from the lower level cache comprising the requested data, the fetch circuitry is configured to fetch the subsequent instruction block based on the requested data.

14. A data processing method comprising:
receiving a result signal from one of a lower level cache and a higher level cache in respect of a first instruction block, wherein the lower level cache and the higher level cache are arranged hierarchically; and
transmitting, a query to the higher level cache for a subsequent instruction block, different from the first instruction block, within a time limit; and
the time limit is smaller when the result signal comprising the requested data originates from the higher level cache than when the result signal comprising the requested data originates from the lower level cache.

15. A non-transitory computer-readable medium to store computer-readable code for fabrication of a data processing apparatus comprising:
receive circuitry configured to receive a result signal from one of a lower level cache and a higher level cache in respect of a first instruction block, wherein the lower level cache and the higher level cache are arranged hierarchically; and
transmit circuitry configured to transmit a query to the higher level cache for a subsequent instruction block, different from the first instruction block, within a time limit; and
the time limit is dependent on an origin of the result signal so that when the result signal comprising the requested data originates from the higher level cache than when the result signal comprising the requested data originates from the lower level cache.

* * * * *